United States Patent
Harada et al.

(10) Patent No.: US 12,004,171 B2
(45) Date of Patent: Jun. 4, 2024

(54) USER TERMINAL AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP); Yuki Matsumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 560 days.

(21) Appl. No.: 17/277,967

(22) PCT Filed: Sep. 21, 2018

(86) PCT No.: PCT/JP2018/035231
§ 371 (c)(1),
(2) Date: Mar. 19, 2021

(87) PCT Pub. No.: WO2020/059153
PCT Pub. Date: Mar. 26, 2020

(65) Prior Publication Data
US 2021/0385800 A1 Dec. 9, 2021

(51) Int. Cl.
*H04W 72/23* (2023.01)
*H04L 5/00* (2006.01)

(52) U.S. Cl.
CPC ........... *H04W 72/23* (2023.01); *H04L 5/0048* (2013.01); *H04L 5/0053* (2013.01)

(58) Field of Classification Search
CPC ..... H04W 72/23; H04L 5/0048; H04L 5/0053
See application file for complete search history.

(56) References Cited

U.S. PATENT DOCUMENTS

| | | | |
|---|---|---|---|
| 10,893,431 B2* | 1/2021 | Liou | H04W 16/28 |
| 2019/0297577 A1* | 9/2019 | Lin | H04W 52/0235 |
| 2020/0008235 A1* | 1/2020 | Sarkis | H04L 5/0055 |
| 2020/0053670 A1* | 2/2020 | Jung | H04W 56/00 |
| 2020/0100248 A1* | 3/2020 | Kim | H04W 48/12 |
| 2021/0050936 A1 | 2/2021 | Seo et al. | |
| 2021/0185652 A1* | 6/2021 | Rune | H04L 5/0053 |

(Continued)

FOREIGN PATENT DOCUMENTS

EP 3 629 645 A1 4/2020

OTHER PUBLICATIONS

Office Action issued in counterpart European Patent Application No. 18 934 478.1 dated Apr. 18, 2023 (8 pages).

(Continued)

*Primary Examiner* — Jael M Ulysse
(74) *Attorney, Agent, or Firm* — Osha Bergman Watanabe & Burton LLP

(57) ABSTRACT

A user terminal includes: a receiving section that monitors a physical downlink control channel for system information or paging in a connected mode; and a control section that determines a downlink reference signal that is quasi-co-location for the physical downlink control channel based on at least one of association between a physical downlink control channel monitoring occasion and a downlink reference signal and configuration information indicating a downlink reference signal that is quasi-co-location for a control resource set including the physical downlink control channel. According to an aspect of the present disclosure, a physical downlink control channel can be appropriately monitored.

3 Claims, 8 Drawing Sheets

(56) References Cited

U.S. PATENT DOCUMENTS

| | | | |
|---|---|---|---|
| 2021/0282143 A1* | 9/2021 | Lee | H04W 52/343 |
| 2021/0314917 A1* | 10/2021 | Lee | H04W 72/02 |
| 2021/0314927 A1* | 10/2021 | Noh | H04L 5/0053 |
| 2021/0336688 A1* | 10/2021 | Lee | H04W 4/40 |
| 2021/0400555 A1* | 12/2021 | Park | H04W 36/0077 |

OTHER PUBLICATIONS

Office Action in counterpart Indian Patent Application No. 202117016647 dated Nov. 18, 2022 (5 pages).

Office Action in counterpart Japanese Patent Application No. 2020-547610 dated Aug. 30, 2022 (6 pages).

3GPP TSG RAN WG1 Meeting #94; R1-1808378 "Corrections to NR PDCCH" CATT; Gothenburg, Sweden; Aug. 20-24, 2018 (8 pages).

Extended European Search Report issued in European Application No. 18934478.1, dated Mar. 29, 2022 (9 pages).

International Search Report issued in PCT/JP2018/035231, dated Nov. 13, 2018 (3 pages).

Written Opinion of the International Searching Authority issued in PCT/JP2018/035231, dated Nov. 13, 2018 (4 pages).

NTT Docomo, Inc.; "Offline summary for PDCCH structure and search space"; 3GPP TSG RAN WG1 Meeting #94, R1-1809855; Gothenburg, Sweden, Aug. 20-24, 2018 (6 pages).

RAN2; "[Draft] LS on OSI acquisition"; 3GPP TSG-RAN2#103, R2-1813296; Gothenburg, Sweden, Aug. 20-24, 2018 (2 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in Chinese Application No. 201880099665.9, dated Jun. 29, 2023 (20 pages).

Office Action issued in the counterpart Chinese Application No. 201880099665.9, mailed Nov. 30, 2023 (15 pages).

Ericsson: "On beam indication, measurement, and reporting", 3GPP TSG-RAN WG1 NR Ad Hoc #3, R1-1716350; Nagoya, Japan, Sep. 18-21, 2017 (13 pages).

* cited by examiner

USER TERMINAL AND RADIO COMMUNICATION METHOD

TECHNICAL FIELD

The present disclosure relates to a user terminal and a radio communication method in a next-generation mobile communication system.

BACKGROUND ART

In the universal mobile telecommunications system (UMTS) network, long term evolution (LTE) has been specified for the purpose of further increasing a data rate, providing low latency, and the like (see Non-Patent Literature 1). In addition, LTE-Advanced (third generation partnership project (3GPP) Rel. (Release) 10-14) has been specified for the purpose of further increasing capacity and sophistication of LTE (3GPP Rel. 8 and 9).

Successor systems to LTE (for example, also referred to as 5th generation mobile communication system (5G), 5G+ (plus), new radio (NR), or 3GPP Rel. 15 or later) are also being studied.

In initial access in NR, at least one of detection of a synchronization signal block (SSB), acquisition of broadcast information (for example, a master information block (MIB)) transmitted by a physical broadcast channel (PBCH, also referred to as P-BCH or the like), and establishment of connection by random access is performed.

Here, SSB is a signal block including at least one of a synchronization signal (for example, a primary synchronization signal (PSS) and a secondary synchronization signal (SSS)) and PBCH, and is also referred to as an SS/PBCH block or the like.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In a future radio communication system (for example, LTE Rel. 15 or later, 5G, 5G+, or NR), monitoring PDCCH by a user terminal based on SSB for system information block 1 (SIB1 and remaining minimum system information (RMSI)) is being studied.

However, an operation of monitoring PDCCH for information other than SIB1 (other system information (OSI), paging) is not clear. When PDCCH is not appropriately monitored, system performance may deteriorate.

Therefore, one of objects of the present disclosure is to provide a user terminal and a radio communication method that appropriately monitor a physical downlink control channel.

Solution to Problem

A user terminal according to an aspect of the present disclosure includes: a receiving section that monitors a physical downlink control channel for system information or paging in a connected mode; and a control section that determines a downlink reference signal that is quasi-co-location for the physical downlink control channel based on at least one of association between a physical downlink control channel monitoring occasion and a downlink reference signal and configuration information indicating a downlink reference signal that is quasi-co-location for a control resource set including the physical downlink control channel.

Advantageous Effects of Invention

According to an aspect of the present disclosure, a physical downlink control channel can be appropriately monitored.

DESCRIPTION OF EMBODIMENTS

CORESET and Search Space

Figure 1:
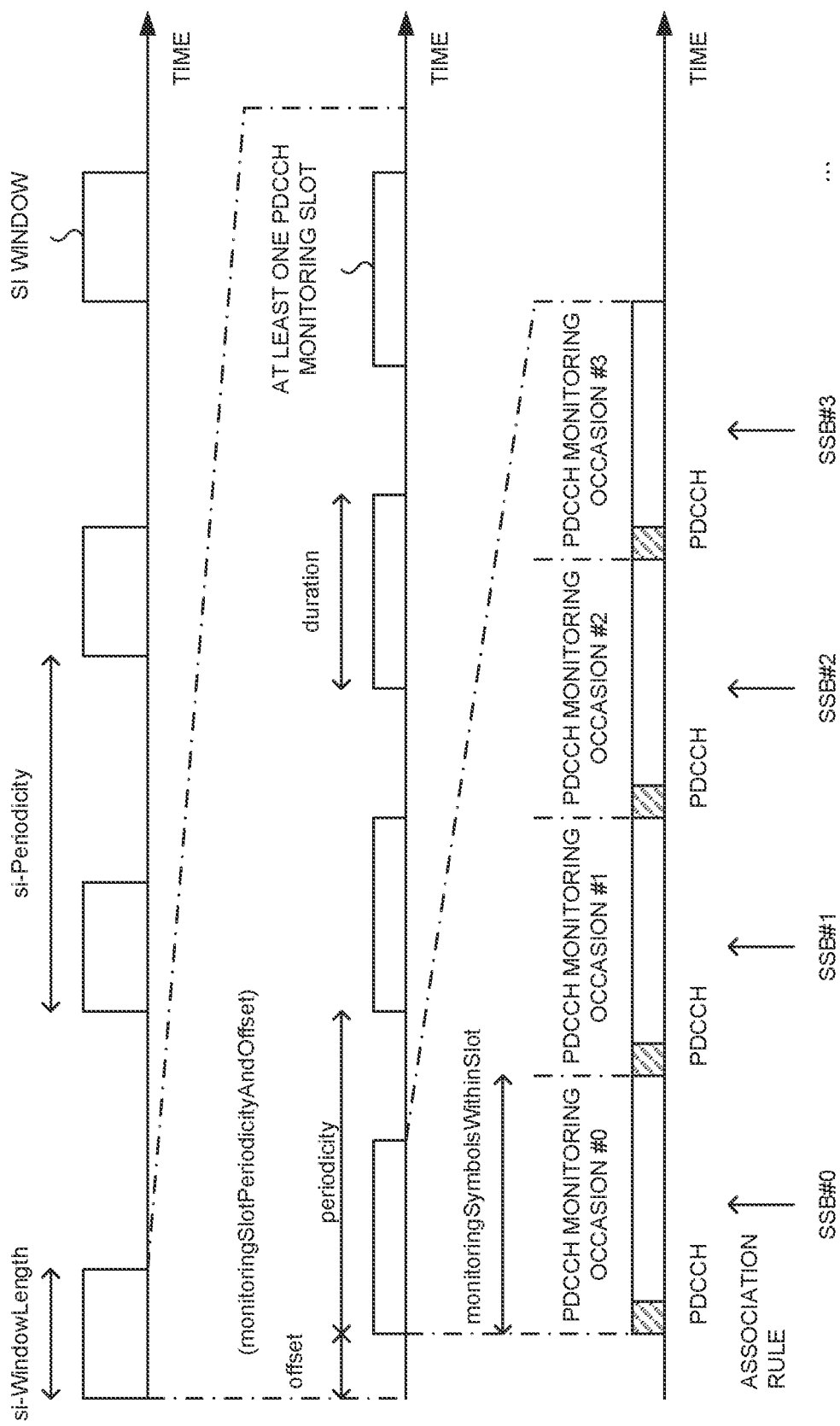
FIG. 1 is a diagram illustrating an example of a rule for association between PDCCH monitoring occasion and SSB.

In a future radio communication system (for example, NR, 5G, 5G+, and Rel. 15 or later), use of a control resource set (CORESET) is being studied in order to transmit a physical layer control signal (for example, downlink control information (DCI)) from a base station (which may be referred to as, for example, a BS, a transmitting/receiving point (TRP), eNodeB (eNB), or NR NodeB (gNB)) to a user terminal.

CORESET is an allocation candidate area of a physical downlink control channel (for example, a physical downlink control channel (PDCCH)). CORESET may include a given frequency domain resource and time domain resource (for example, 1 or 2 OFDM symbol). PDCCH (or DCI) is mapped to a given resource unit in CORESET.

The given resource unit only needs to be, for example, at least one of a control channel element (CCE), a CCE group including one or more CCEs, a resource element group (REG) including one or more resource elements (RE), one or more REG bundles (REG group), and a physical resource block (PRB).

The user terminal monitors (blind-decodes) a search space (SS) in CORESET and detects DCI for the user terminal. The search space may include a (cell-specific) search space used for monitoring DCI common to one or more user terminals (common search space (CSS)) and a user terminal-specific search space used for monitoring DCI (user-specific search space (USS)).

CSS may include at least one of the following:
Type 0-PDCCH CSS
Type 0A-PDCCH CSS
Type 1-PDCCH CSS
Type 2-PDCCH CSS
Type 3-PDCCH CSS Type 0-PDCCH CSS is also referred to as SS for SIB1, SS for remaining minimum system information (RMSI), or the like. Type 0-PDCCH CSS may be a search space for DCI that is subjected to cyclic redundancy check (CRC) scrambling with a given identifier (for example, a system information-radio network temporary identifier (SI-RNTI)) (a search space for monitoring DCI that schedules a physical downlink shared channel (PDSCH) that transmits SIB1).

Here, CRC scrambling is to add (include) a CRC bit scrambled (masked) with a given identifier to (in) DCI.

Type 0A-PDCCH CSS is also referred to as SS for other system information (OSI). Type 0A-PDCCH CSS may be a search space for DCI that is subjected to CRC scrambling with a given identifier (for example, SI-RNTI, Cell-RNTI (C-RNTI), modulation and coding scheme-Cell-RNTI (MCS-C-RNTI), or configured scheduling RNTI (CS-RNTI)) (a search space for monitoring DCI that schedules PDSCH that transmits OSI).

Type 1-PDCCH CSS is also referred to as SS for random access (RA) or the like. Type 1-PDCCH CSS may be a search space for DCI that is subjected to CRC scrambling with a given identifier (for example, random access-RNTI (RA-RNTI), temporary Cell-RNTI (TC-RNTI), C-RNTI, MCS-C-RNTI, or CS-RNTI) (a search space for monitoring DCI that schedules PDSCH that transmits a message for RA procedure (for example, random access response (PAR), message 2) or a message for conflict resolution (message 4)).

Type 2-PDCCH CSS is also referred to as SS for paging or the like. Type 2-PDCCH CSS may be a search space for DCI that is subjected to CRC scrambling with a given identifier (for example, paging-RNTI (P-RNTI), C-RNTI, MCS-C-RNTI, or CS-RNTI) (a search space for monitoring DCI that schedules PDSCH that transmits paging).

Type 3-PDCCH CSS may be a search space for DCI that is subjected to CRC scrambling with a given identifier (for example, interruption RNTI (INT-RNTI) for DL preemption indication, slot format indicator RNTI (SFI-RNTI) for slot format indication, TPC-PUSCH-RNTI for transmit power control (TPC) of physical uplink shared channel (PUSCH), TPC-PUCCH-RNTI for TPC of physical uplink control channel (PUCCH), TPC-SRS-RNTI for TPC of sounding reference signal (SRS), C-RNTI, MCS-C-RNTI, CS-RNTI, or semi-persistent-CSI-RNTI (SP-CSI-RNTI)).

USS may be a search space for DCI to (in) which a CRC bit that is subjected to CRC scrambling with a given identifier (for example, C-RNTI, MCS-C-RNTI, CS-RNTI, or SP-CSI-RNTI) is added (included).

By the way, in initial access in NR, at least one of detection of a synchronization signal block (SSB, SS/PBCH block), acquisition of broadcast information (for example, a master information block (MIB)) transmitted by a physical broadcast channel (PBCH, also referred to as P-BCH or the like), and establishment of connection by random access is performed.

For example, a user equipment (UE) determines CORESET for Type 0-PDCCH CSS and PDCCH monitoring occasion based on the detected SSB. UE may specify type 0-PDCCH CSS by CORESET #0 and search space #0.

CORESET #0 may be CORESET in which PDCCH (or DCI) for scheduling a downlink shared channel (for example, physical downlink shared channel (PDSCH)) that transmits SIB1 is disposed. CORESET #0 may be CORESET with CORESET ID (ControlResourceSetId)=0. CORESET #0 may be CORESET determined by at least one of SSB reception in the initial access and information indicating CORESET in system information. The search space #0 may be a search space determined by at least one of SSB reception in the initial access and information indicating the search space in system information.

Thereafter, UE monitors type 0-PDCCH CSS in the PDCCH monitoring occasion and receives system information (for example, SIB1 or RMSI) in PDSCH scheduled by the received PDCCH.

A search space (SearchSpace or search space ID (SearchSpaceID)) such as a search space for OSI (OSI search space) or search space for paging (paging search space) may be associated with one CORESET (or CORESET ID (ControlResourceSetId)). The OSI search space and the paging search space may be associated with CORESET #0 (ControlResourceSetZero) or common CORESET (commonControlResourceSet).

The common CORESET may be CORESET which is other than CORESET #0 (ControlResourceSetId=0) and in which PDCCH for scheduling a physical downlink shared channel that transmits at least one of random access response (RAR), paging, and system information (SIB1 and OSI) can be disposed.

The system information (for example, SIB1) may include common PDCCH configuration information (PDCCH-ConfigCommon). The common PDCCH configuration information may include CORESET #0 information (controlResourceSetZero) and common CORESET information (commonControlResourceSet) as CORESET information. The common PDCCH configuration information may further include at least one of search space #0 information (searchSpaceZero), SIB1 search space (type 0-PDCCH CSS) information (searchSpaceSIB1), OSI search space (type 0A-PDCCH CSS) information (searchSpaceOtherSystemInformation), paging search space (type 2-PDCCH CSS) information (pagingSearchSpace), and random access search space (type 1-PDCCH CSS) information (ra-SearchSpace).

(QCL)

UE may assume that an antenna port of a PDCCH demodulation reference signal (DMRS) in CORESET and a search space and the detected SSB have a quasi-co-location (QCL) relation.

QCL is an index indicating a statistical property of at least one of a channel and a signal (channel/signal). For example, when one signal and another signal have a QCL relation, this may mean that it is possible to assume that the plurality of different signals have at least one identical property (a QCL relation is established regarding at least one of these) out of: Doppler shift, Doppler spread, average delay, delay spread, and spatial parameter (for example, spatial Rx parameter).

Information regarding QCL may be referred to as transmission configuration indication (TCI) or a transmission configuration indicator state (TCI-state). The TCI-state may be identified by a given identifier (TCI-state ID (TCI-StateId)).

A plurality of types of QCL (QCL types) may be defined. For example, four QCL types A to D with different parameters (or parameter sets) that can be assumed to be identical may be provided. These parameters are as follows:
- QCL type A: Doppler shift, Doppler spread, average delay, and delay spread;
- QCL Type B: Doppler shift and Doppler spread;
- QCL type C: Doppler shift and average delay; and
- QCL type D: Spatial Rx parameter.

Note that "a plurality of channels/signals has an identical TCI-state or different TCI-states" means that "a plurality of channels/signals is transmitted or received using different beams or an identical beam (or transmission and reception point (TRP))". A user terminal can assume that channels/signals are transmitted from different beams (TRPs) when the TCI-states are different. The term "TRP" may be replaced with another term such as network, base station, antenna equipment, antenna panel, serving cell, cell, component carrier (CC), or carrier.

A signal having a QCL relation with PDCCH (DMRS of PDCCH) (for example, downLink-reference signal (DL-RS), SSB, or CSI-RS) may be referred to as a QCL source of PDCCH (QCL reference or QCL reference signal) or a TCI-state for PDCCH. UE may associate (or set) a QCL source with at least one of PDCCH, PDCCH monitoring occasion, search space, and CORESET.

For UE, a list of TCI-states for PDCCH (tci-StatesPDCCH-ToAddList) may be configured by common CORESET configuration information (for example, commonControlResourceSet or ControlResourceSet). UE may receive a MAC CE (MAC CE for activation) that indicates one TCI-state for PDCCH (tci-StatesPDCCH) in the list and may activate the TCI-state for PDCCH indicated by the MAC CE.

PDCCH Monitoring Occasion

As illustrated in FIG. 1, in NR, for UE, an SI window (si-WIndowLength, si-Periodicity) for receiving a System Information (SI) message may be configured by higher layer signaling (for example, SIB1 or SI-SchedulingInfo).

For UE, a search space (OSI search space, searchSpaceOtherSystemInformation (OSI), or osi-SearchSpace) for system information (Other System Information (OSI), system information other than SIB1) in the SI window may be configured by higher layer signaling (for example, SIB1, ServingCellConfigCommonSIB, DownlinkConfigCommonSIB, BWP-DownlinkCommon, or PDCCH-ConfigCommon).

A search space (SearchSpace) may indicate, for example, at least one PDCCH monitoring slot in the SI window (for example, a period per slot and offset (monitoringSlotPeriodicityAndoffset) or duration per slot (for example, duration)) or PDCCH monitoring occasion in the PDCCH monitoring slot (for example, the number of monitoring symbols in the PDCCH monitoring slot (monitoringSymbolsWithinSlot).

These configurations allow UE to monitor PDCCH in the PDCCH monitoring occasion in the SI window.

In a case of default association between the PDCCH monitoring occasion and SSB (when OSI search space information (osi-SearchSpace) is not configured), the PDCCH monitoring occasion for SI message in the SI window is the same as the PDCCH monitoring occasion for RMSI (SIB1), and mapping between the PDCCH monitoring occasion and SSB may be defined by specifications.

In a case of non-default association between the PDCCH monitoring occasion and SSB (when OSI search space information is configured), the K-th PDCCH monitoring occasion in the SI window may correspond to the K-th transmitted SSB.

That is, among the PDCCH monitoring occasions configured in the SI window, UE may use the K-th transmitted SSB as a QCL source of PDCCH reception in the K-th PDCCH monitoring occasion (rule for association between PDCCH monitoring occasion and SSB). UE can determine a PDCCH monitoring occasion to be monitored based on reception of the received SSB, and therefore does not need to monitor all the configured PDCCH monitoring occasions.

In the example of FIG. 1, PDCCH monitoring occasions #0 to #3 are numbered by time method, and transmitted SSB #0 to #3 are numbered by time direction. PDCCH monitoring occasions #0 to #3 are associated with SSB #0 to #3, respectively.

For UE, a paging frame (PF) for paging (for example, a period, a frame offset, or the number of frames) may be configured based on higher layer signaling (for example, SIB1, ServingCellConfigCommonSIB, DownlinkConfigCommonSIB, or paging control channel (PCCH) configuration information (PCCH-Config)). UE may determine a starting position of a paging occasion (PO) within a paging frame (first PDCCH monitoring occasion) based on UE ID and higher layer signaling (for example, SIB1, ServingCellConfigCommonSIB, DownlinkConfigCommonSIB, or PCCH-Config).

For UE, a search space for paging (paging search space, pagingSearchSpace, paging-SearchSpace) may be configured by higher layer signaling (for example, SIB1, ServingCellConfigCommonSIB, DownlinkConfigCommonSIB, BWP-DownlinkCommon, or PDCCH-ConfigCommon).

In the present disclosure, the OSI search space may be replaced with a paging search space. The SI window may be replaced with a paging frame. The PDCCH monitoring slot may be replaced with a paging occasion.

Among enabled PDCCH monitoring occasions after the paging occasion starting position in the paging frame (PDCCH monitoring occasions in the paging occasion), UE in an idle mode (RRC_IDLE) may use the K-th transmitted SSB as a QCL source for PDCCH reception in the K-th PDCCH monitoring occasion (rule for association between PDCCH monitoring occasion and SSB).

It is being studied that NW (for example, base station) and UE recognize SSB, CORESET #0, and search space #0 in common for broadcast PDCCH and non-broadcast PDCCH in a connected mode (RRC_CONNECTED) (which CORESET #0 and which search space #0 are monitored based on which SSB).

Which search space is monitored based on which SSB for broadcast PDCCH in both an inactive mode (RRC_INACTIVE) and an idle mode (RRC_IDLE) may depend on UE implementation. UE in an inactive mode and UE in an idle mode do not transmit UL signals, and therefore NW does not have to know which search space is monitored based on the SSB.

When NW cannot grasp a QCL source (SSB or beam) used by each UE as in an idle mode, UE can monitor only a PDCCH monitoring occasion corresponding to the received SSB by using the above-described association rule even when the PDCCH monitoring occasions corresponding to all SSBs are configured. When this association rule is not used, UE monitors all PDCCH monitoring occasions in the SI window. Therefore, by using the association rule, power consumption of UE in an idle mode can be suppressed.

However, when NW can grasp a QCL source (SSB or beam) used by each UE as in a connected mode, a UE operation is not clear.

For example, when common CORESET is associated with an OSI search space or a paging search space, what a TCI-state for PDCCH (tci-StatesPDCCH or tci-StatesPDCCH-ToAddList) in the common CORESET configuration information means is not clear. If the association rule is applied, it is not clear whether the TCI-state for PDCCH is unnecessary and whether UE ignores the TCI-state for PDCCH.

For example, when CORESET #0 is associated with the OSI search space or the paging search space, the TCI-state for PDCCH cannot be configured for CORESET #0 at present. It is not clear whether or not to apply the association rule. If the association rule is applied, it is not clear how NW recognizes a PDCCH monitoring occasion to be monitored when UE determines the PDCCH monitoring occasion to be monitored, and how NW configures a PDCCH monitoring occasion monitored by UE in UE when NW determines the PDCCH monitoring occasion to be monitored by UE.

Therefore, the present inventors have conceived of a method in which UE in a connected mode receives system information (for example, OSI) or PDCCH for paging using an appropriate QCL source. According to an aspect of the present disclosure, NW and UE can match recognition of a PDCCH monitoring occasion and recognition of a QCL source. According to an aspect of the present disclosure, unnecessary PDCCH monitoring can be prevented. According to an aspect of the present disclosure, system performance can be improved, and a load on UE can be reduced.

Hereinafter, embodiments according to the present disclosure will be described in detail with reference to the drawings. Radio communication methods according to the embodiments may be each applied independently, or may be applied in combination thereof.

Hereinafter, operations of UE and NW in a connected mode will be described. Hereinafter, a case where a QCL source is SSB will be mainly described, but SSB may be replaced with another RS such as CSI-RS.

Radio Communication Method (Aspect 1)

UE may determine a QCL source recognition method (method for recognizing a PDCCH monitoring occasion and a QCL source) depending on CORESET in which PDCCH for OSI or paging is transmitted. UE may determine the QCL source recognition method depending on CORESET configured for OSI or paging. UE may monitor PDCCH using a recognized QCL source (an index indicating DL-RS, an SSB index, a CSI-RS resource index, or the like).

<Aspect 1-1>

When CORESET associated with a search space for OSI or paging is CORESET #0, UE may recognize a QCL source based on an association rule.

The association rule for OSI may be to use the K-th transmitted SSB as a QCL source for PDCCH reception in the K-th PDCCH monitoring occasion among PDCCH monitoring occasions configured in the SI window. The association rule for paging may be to use the K-th transmitted SSB as a QCL source for PDCCH reception in the K-th PDCCH monitoring occasion among enabled PDCCH monitoring occasions after a paging occasion starting position in a paging frame.

Assume that the number of SSBs actually transmitted is N. For UE, N or more PDCCH monitoring occasions included in one SI window may be configured by configuration information of the OSI search space. For UE, N or more PDCCH monitoring occasions included in the paging occasion in one paging frame may be configured by configuration information of the paging channel.

<<When the Number of PDCCH Monitoring Occasions is Larger than the Number of SSBs>>

When the number of PDCCH monitoring occasions configured for OSI or paging is larger than N, UE may perform PDCCH monitoring according to one of the following monitoring methods 1 and 2.

Monitoring Method 1

UE assumes that association between a PDCCH monitoring occasion and SSB is repeatedly performed in accordance with the association rule, associates SSB with the N+1-th or later PDCCH monitoring occasion, and performs monitoring using the associated SSB in the PDCCH monitoring occasion.

For example, when SSB #0 to #7 are transmitted (N=8) and PDCCH monitoring occasions #0 to #15 are configured, PDCCH monitoring occasions #0 and #8 are associated with SSB #0. UE that has received SSB #0 may perform PDCCH monitoring in PDCCH monitoring occasions #0 and #8.

Monitoring Method 2

UE assumes that SSB is not associated with the N+1-th or later PDCCH monitoring occasion, and does not perform monitoring in the PDCCH monitoring occasion.

For example, when SSB #0 to #7 are transmitted (N=8) and PDCCH monitoring occasions #0 to #15 are configured, PDCCH monitoring occasion #0 is associated with SSB #0. UE that has received SSB #0 may perform PDCCH monitoring in PDCCH monitoring occasion #0.

According to these monitoring methods, UE can appropriately monitor PDCCH even when the number of PDCCH monitoring occasions configured for OSI or paging is larger than N.

<<Method for Recognizing PDCCH Monitoring Occasion and QCL Source>>

NW and UE may match recognition of a PDCCH monitoring occasion monitored by UE and recognition of a QCL source according to one of the following recognition methods 1 and 2.

Recognition Method 1

UE may determine a QCL source used for PDCCH monitoring for OSI or paging based on the received SSB. UE may select a physical random access channel (PRACH) from among a plurality of PRACH candidates based on the received SSB. NW and UE may recognize SSB corresponding to PRACH in the last successful random access procedure as a QCL source used for PDCCH monitoring for OSI or paging. NW and UE may maintain or update a QCL source each time the random access procedure is successful.

Recognition Method 2

NW may determine a QCL source used for PDCCH monitoring for OSI or paging. NW may notify UE of the QCL source using MAC CE or DCI.

Figure 2:
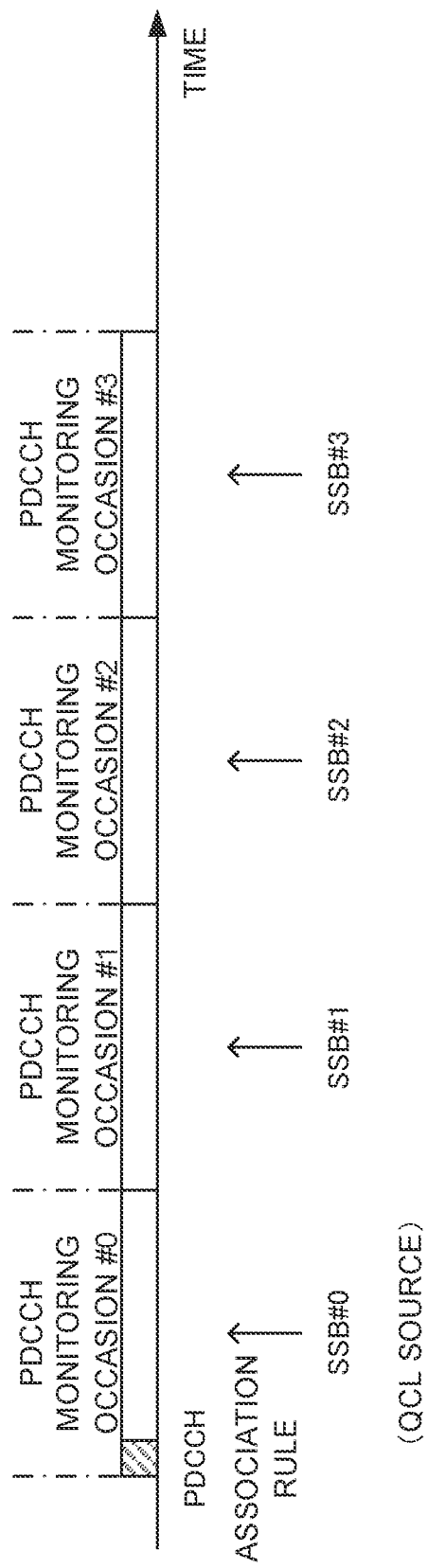
FIG. 2 is a diagram illustrating an example of PDCCH monitoring according to aspect 1-1.

In the example of FIG. 2, for UE, PDCCH monitoring occasions #0 to #3 associated with SSBs #0 to #3 to be transmitted are configured, respectively. It is assumed that NW and UE recognize SSB #0 as a QCL source of PDCCH by the recognition method 1 or 2. UE may perform monitoring using SSB #0 only in the PDCCH monitoring occasion #0 associated with SSB #0 which is a QCL source. NW may transmit PDCCH using SSB #0 only in the PDCCH monitoring occasion #0 associated with SSB #0 which is a QCL source.

According to these PDCCH monitoring occasion recognition methods, NW and UE can match recognition of a PDCCH monitoring occasion monitored by UE (QCL source).

From the above, even when CORESET for OSI or paging is CORESET #0, NW and UE can match recognition of a PDCCH monitoring occasion to be monitored and recognition of a QCL source, and can appropriately transmit/receive PDCCH. In addition, NW and UE can limit a PDCCH monitoring occasion to be monitored among the configured plurality of PDCCH monitoring occasions according to the recognized QCL source. Therefore, a load on UE and the amount of resources for PDCCH can be suppressed.

<Aspect 1-2>

When CORESET associated with a search space for OSI or paging is other than CORESET #0 (for example, common CORESET), UE may recognize a QCL source based on a TCI-state for PDCCH. The CORESET configuration information may include the TCI-state for PDCCH, or may include a list of a plurality of TCI-states for PDCCH.

When N SSBs are transmitted, the list of TCI-states for PDCCH may include N TCI-states for PDCCH indicating N SSBs (indexes), respectively. UE may activate one state in the list by MAC CE.

For UE, a PDCCH monitoring occasion may be configured according to one of the following configuration methods 1 and 2.

Configuration Method 1

For UE, at least one PDCCH monitoring occasion corresponding to one SSB may be configured according to configuration information of a search space (OSI search space or paging search space).

UE may use the active TCI-state for PDCCH for monitoring as a QCL source for the configured PDCCH monitoring occasion. When a plurality of PDCCH monitoring occasions is configured in an SI window (paging occasion in a paging frame), UE may monitor all the configured PDCCH monitoring occasions using one QCL source corresponding thereto.

UE may receive information indicating switching (switching destination) of a PDCCH monitoring occasion (for example, a symbol position) to be monitored by RRC reconfiguration information (RRCReconfiguration message). In this case, NW can flexibly switch a PDCCH monitoring occasion to be monitored. For example, the NW can switch PDCCH monitoring occasions using the same QCL source.

UE may monitor PDCCH using an active TCI-state for PDCCH in the configured PDCCH monitoring occasion. In this case, NW can flexibly switch a QCL source used for monitoring. For example, NW can switch QCL sources used for the same PDCCH monitoring occasion.

When a plurality of PDCCH monitoring occasions corresponding to one SSB is configured for UE, NW only needs to transmit PDCCH in at least one of the plurality of PDCCH monitoring occasions (a plurality of candidates), and therefore can flexibly determine a PDCCH monitoring occasion that actually transmits PDCCH, for example, when another piece of data with a high degree of priority is generated. Therefore, flexibility of scheduling PDCCH and PDSCH (OSI or paging) can be increased. When PDCCH is repeatedly transmitted in each of the plurality of PDCCH monitoring occasions, UE only needs to receive PDCCH in at least one of the plurality of PDCCH monitoring occasions, and therefore reception performance of PDCCH can be improved.

Figure 3:
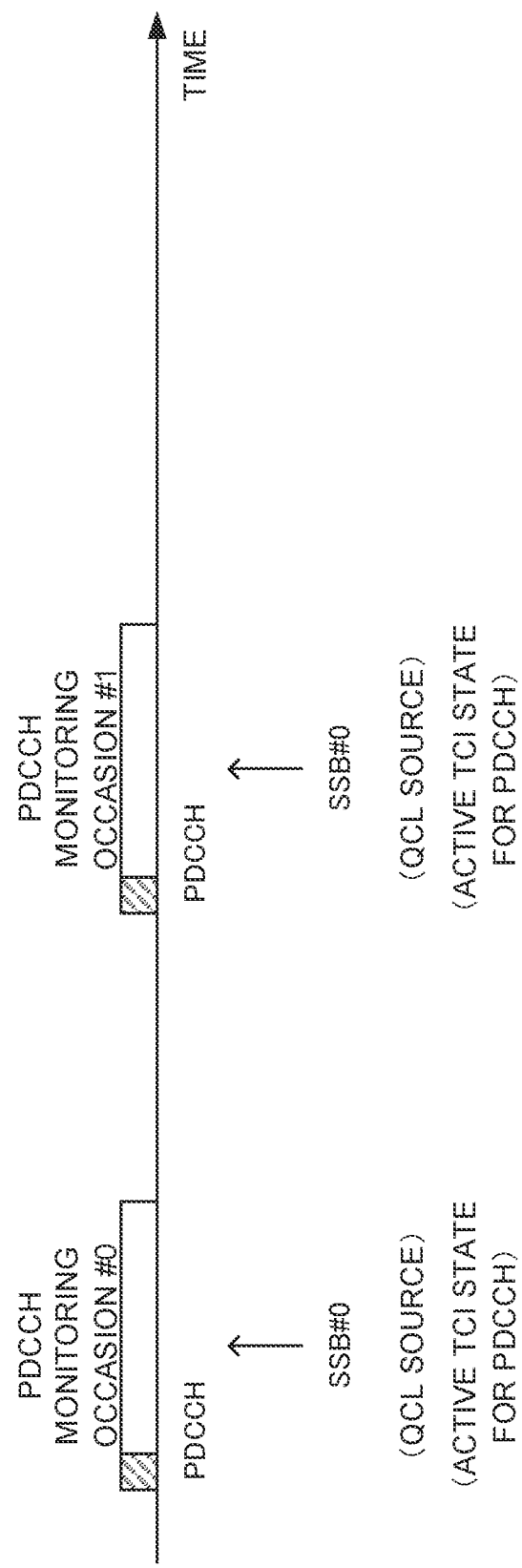
FIG. 3 is a diagram illustrating an example of PDCCH monitoring according to configuration method 1 of aspect 1-2.

In the example of FIG. 3, for UE, PDCCH monitoring occasions #0 and #1 are configured. When SSB #0 is activated as a TCI-state for PDCCH, UE recognizes SSB #0 as a QCL source of PDCCH. UE performs monitoring using SSB #0 which is a QCL source in all the configured PDCCH monitoring occasions #0 and #1. NW transmits PDCCH using SSB #0 which is a QCL source in all the configured PDCCH monitoring occasions #0 and #1.

When one PDCCH monitoring occasion corresponding to one SSB is configured for UE, the amount of resources for PDCCH and a load on UE can be suppressed.

According to this configuration method 1, UE can appropriately determine a QCL resource used for a PDCCH monitoring occasion using a TCI-state for PDCCH. In addition, since a PDCCH monitoring occasion corresponding to one TCI-state for PDCCH is configured by configuration information of a search space, a load on UE and the amount of resources for PDCCH can be suppressed.

Configuration Method 2

Assume that the number of SSBs actually transmitted is N. For UE, N PDCCH monitoring occasions included in one SI window may be configured by configuration information of a search space.

For example, for UE, N PDCCH monitoring occasions included in one SI window may be configured by configuration information of the OSI search space. For example, for UE, N PDCCH monitoring occasions included in a paging occasion in one paging frame may be configured by configuration information of a paging channel.

Another RS such as CSI-RS (CSI-RS resource index) may be used instead of SSB (SSB index). The association rule for OSI may be to use CSI-RS having the K-th CSI-RS resource index as a QCL source for PDCCH reception in the K-th PDCCH monitoring occasion among PDCCH monitoring occasions configured in the SI window. The association rule for paging may be to use CSI-RS having the K-th CSI-RS resource index as a QCL source for PDCCH reception in the K-th PDCCH monitoring occasion among enabled PDCCH monitoring occasions after a paging occasion starting position in a paging frame.

UE may activate one of the TCI-states for PDCCH in the list by MAC CE.

UE may determine a PDCCH monitoring occasion corresponding to an active TCI-state for PDCCH based on the association rule, and may monitor PDCCH using the active TCI-state for PDCCH in the determined PDCCH monitoring occasion. In this case, NW can flexibly switch between a QCL source used for monitoring and a PDCCH monitoring occasion to be monitored.

Figure 4:
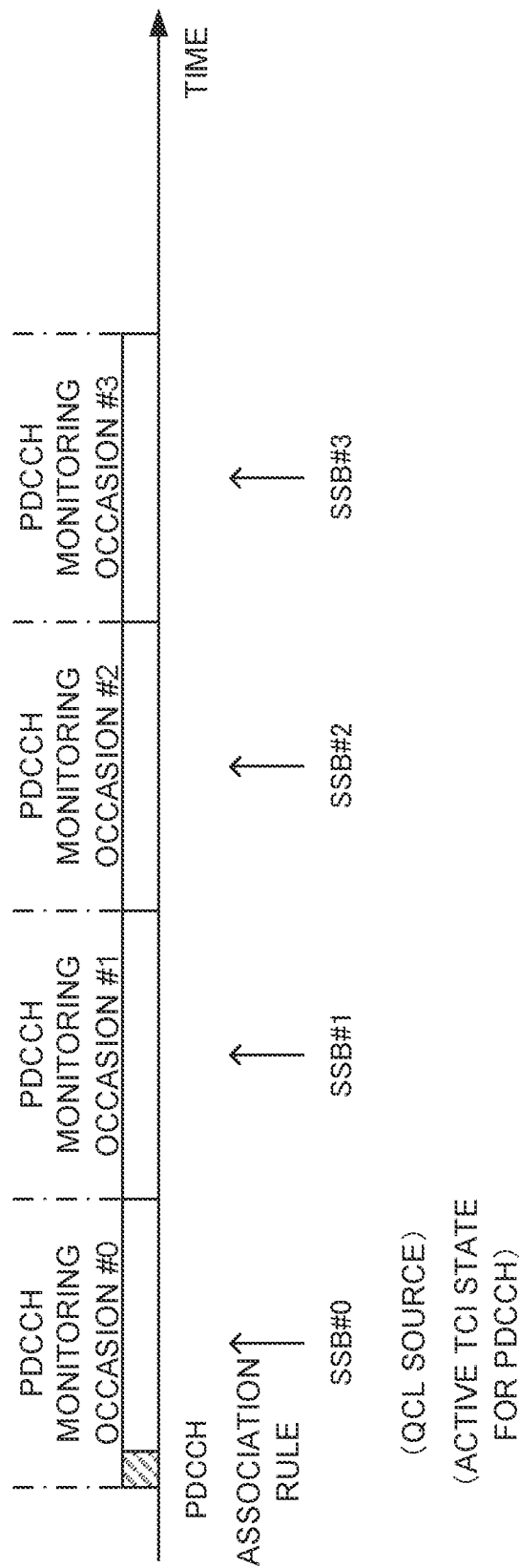
FIG. 4 is a diagram illustrating an example of PDCCH monitoring according to configuration method 2 of aspect 1-2.

In the example of FIG. 4, for UE, PDCCH monitoring occasions #0 to #3 associated with SSBs #0 to #3 to be transmitted are configured, respectively. When SSB #0 is activated as a TCI-state for PDCCH, NW and UE recognize SSB #0 which is the active TCI-state for PDCCH as a QCL source of PDCCH. UE may perform monitoring using SSB #0 only in the PDCCH monitoring occasion #0 associated with SSB #0 which is a QCL source. NW may transmit PDCCH using SSB #0 only in the PDCCH monitoring occasion #0 associated with SSB #0 which is a QCL source.

According to this configuration method 2, UE can appropriately determine a PDCCH monitoring occasion using a TCI-state for PDCCH. In addition, since a plurality of PDCCH monitoring occasions configured by configuration information of a search space is limited by the active TCI-state for PDCCH, a load on UE can be suppressed.

In addition, since UE does not need to perform PDCCH monitoring using all the QCL sources, a load on UE and the amount of resources for PDCCH can be suppressed.

According to this aspect 1-2, even when CORESET for OSI or paging is other than CORESET #0, NW and UE can match recognition of a PDCCH monitoring occasion to be monitored and recognition of a QCL source, and can appropriately transmit/receive PDCCH.

(Aspect 2)

UE may recognize a QCL source not depending on CORESET in which PDCCH for OSI or paging is transmitted.

UE may recognize a QCL source according to one of the following aspects 2-1 and 2-2.

<Aspect 2-1>

UE may recognize a QCL source based on the association rule not depending on CORESET in which PDCCH for OSI or paging is transmitted.

When CORESET associated with a search space for OSI or paging is CORESET #0, NW and UE may operate as in aspect 1-1.

When CORESET associated with a search space for OSI or paging is other than CORESET #0 (for example, common CORESET), UE may assume that a TCI-state for PDCCH is not configured in the CORESET configuration information, or may ignore a TCI-state for PDCCH in the CORESET configuration information. In this case, NW and UE may operate as in aspect 1-1.

According to this aspect 2-1, regardless whether or not CORESET for OSI or paging is CORESET #0, NW and UE can match recognition of a PDCCH monitoring occasion to be monitored and recognition of a QCL source, and can appropriately transmit/receive PDCCH. In addition, NW and UE can limit a PDCCH monitoring occasion to be monitored among the configured plurality of PDCCH monitoring occasions according to the recognized QCL source. Therefore, a load on UE and the amount of resources for PDCCH can be suppressed.

<Aspect 2-2>

UE may recognize a QCL source based on a TCI-state for PDCCH not depending on CORESET in which PDCCH for OSI or paging is transmitted.

When CORESET associated with a search space for OSI or paging is CORESET #0, UE may be notified of a TCI-state for PDCCH or a parameter corresponding thereto. The TCI-state for PDCCH in CORESET #0 may be included in the configuration information of CORESET #0 or may be included in SIB1. In this case, NW and UE may operate as in aspect 1-2.

When CORESET associated with a search space for OSI or paging is other than CORESET #0 (for example, common CORESET), NW and UE may operate as in aspect 1-2.

According to this aspect 2-2, regardless whether or not CORESET for OSI or paging is CORESET #0, NW and UE can match recognition of a PDCCH monitoring occasion to be monitored and recognition of a QCL source, and can appropriately transmit/receive PDCCH. In addition, due to limitation to a PDCCH monitoring occasion corresponding to one TCI-state for PDCCH, a load on UE and the amount of resources for PDCCH can be suppressed.

(Aspect 3)

NW and UE may apply different types of processing in aspect 1 (first operation), aspect 2-1 (second operation), and aspect 2-2 (third operation) to PDCCH monitoring for OSI (PDCCH monitoring occasion and QCL source) and PDCCH monitoring for paging (PDCCH monitoring occasion and QCL source).

According to this aspect 3, PDCCH monitoring for OSI and PDCCH monitoring for paging can be flexibly configured.

(Aspect 4)

In RMSI (SIB1) PDCCH monitoring in a connected mode, NW and UE may match recognition of a PDCCH monitoring occasion monitored by UE and recognition of a QCL source according to the above-described recognition methods 1 and 2. For UE, a PDCCH monitoring occasion for SIB1 may be configured by configuration information of an SIB1 search space (searchSpaceSIB1). UE in a connected mode may perform RMSI PDCCH monitoring in at least one of SIB1 update, handover, and addition of PSCell or SCell.

The PDCCH monitoring occasion for SIB1 is associated with SSB. A method for recognizing a PDCCH monitoring occasion monitored by UE and a QCL source (recognition method 1 or 2) may be common to a method for recognizing a PDCCH monitoring occasion and a QCL source in at least one of PDCCH monitoring for OSI and PDCCH monitoring for paging.

According to this aspect 4, in the RMSI PDCCH monitoring, NW and UE can match recognition of a PDCCH monitoring occasion and recognition of a QCL source, and can appropriately transmit/receive PDCCH.

Radio Communication System

Hereinafter, a configuration of a radio communication system according to an embodiment of the present disclosure will be described. In this radio communication system, communication is performed using any one of the radio communication methods according to the embodiments of the present disclosure or a combination thereof.

Figure 5:
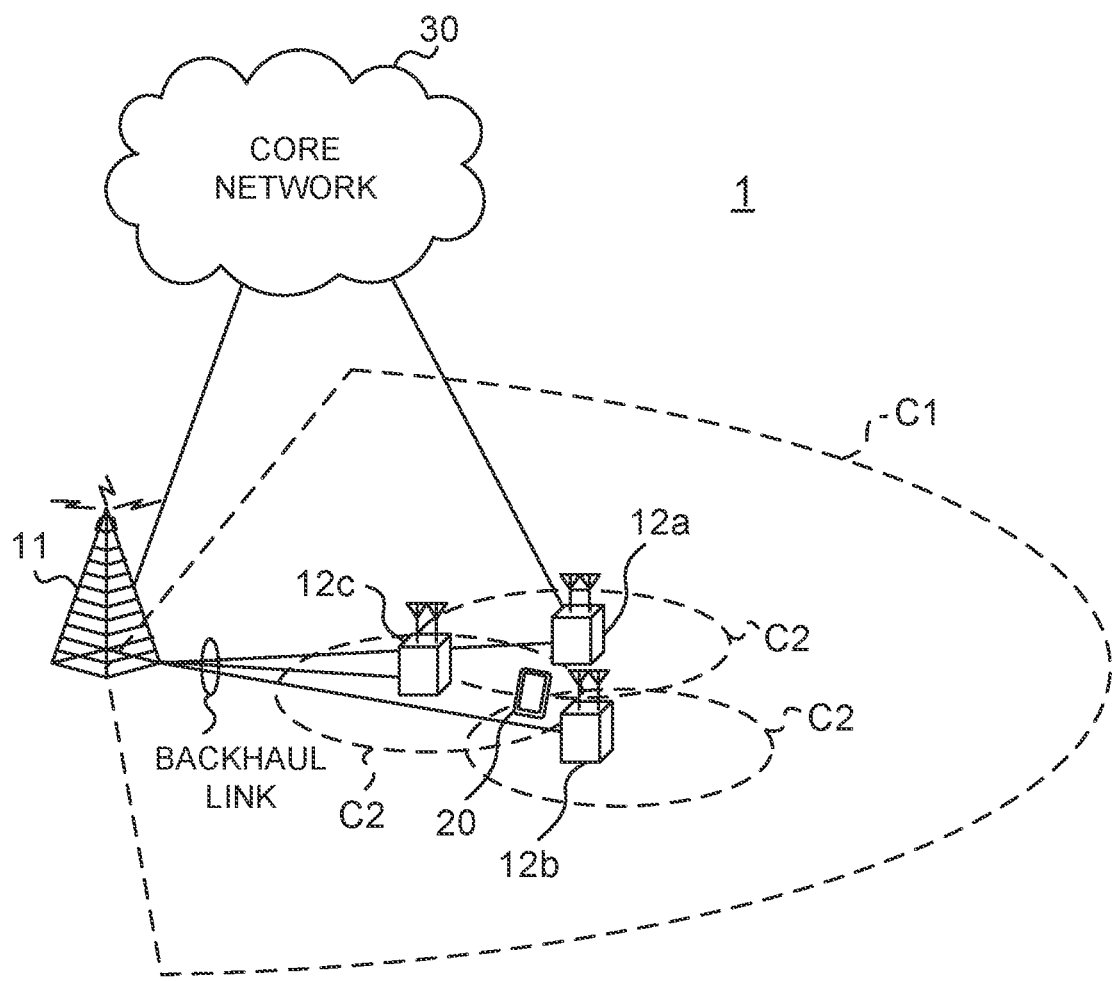
FIG. 5 is a diagram illustrating an example of a schematic configuration of a radio communication system according to an embodiment.

FIG. 5 is a diagram illustrating an example of a schematic configuration of a radio communication system according to an embodiment. A radio communication system 1 may be a system that implements communication using long term evolution (LTE), 5th generation mobile communication system new radio (5G NR), and the like specified by third generation partnership project (3GPP).

In addition, the radio communication system 1 may support dual connectivity between a plurality of radio access technologies (RATs) (multi-RAT dual connectivity (MR-DC)). MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In EN-DC, an LTE (E-UTRA) base station (eNB) is a master node (MN), and an NR base station (gNB) is a secondary node (SN). In NE-DC, an NR base station (gNB) is MN, and an LTE (E-UTRA) base station (eNB) is SN.

The radio communication system 1 may support dual connectivity between a plurality of base stations in identical RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12*a* to 12*c*) that are disposed within the macro cell C1 and that form small cells C2 narrower than the macro cell C1. A user terminal 20 may be located in at least one cell. The arrangement, number, and the like of cells and the user terminals 20 are not limited to the aspects illustrated in the drawings. Hereinafter the base stations 11 and 12 will be collectively referred to as "base stations 10" when the base stations 11 and 12 are not distinguished from each other.

The user terminal 20 may be connected to at least one of the plurality of base stations 10. The user terminal 20 may use at least one of carrier aggregation and dual connectivity (DC) using a plurality of component carriers (CC).

Each CC may be included in at least one of a frequency range 1 (FR1) and a frequency range 2 (FR2). The macro cell C1 may be included in FR1, and the small cell C2 may be included in FR2. For example, FR1 may be a frequency band of 6 GHz or less (sub-6 GHz), and FR2 may be a frequency band higher than 24 GHz (above-24 GHz). Note that the frequency bands, definitions, and the like of FR1 and FR2 are not limited to these, and for example, FR1 may be a frequency band higher than FR2.

The user terminal 20 may perform communication in each CC using at least one of time division duplex (TDD) and frequency division duplex (FDD).

The plurality of base stations 10 may be connected by wire (for example, an optical fiber or an X2 interface in compliance with common public radio interface (CPRI)) or by radio (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

A base station 10 may be connected to a core network 30 via another base station 10 or directly. The core network 30 may include, for example, at least one of evolved packet core (EPC), 5G core network (5GCN), next generation core (NGC), and the like.

The user terminal 20 may correspond to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH) shared by the user terminals 20, a physical broadcast channel (PBCH), a physical downlink control channel (PDCCH), or the like may be used.

In the radio communication system 1, as an uplink channel, a physical uplink shared channel (PUSCH) shared by the user terminals 20, a physical uplink control channel (PUCCH), a physical random access channel (PPACH), or the like may be used.

PDSCH transmits user data, higher layer control information, system information block (SIB), and the like. PUSCH may transmit user data, higher layer control information, and the like. PBCH may transmit master information block (MIB).

PDCCH may transmit lower layer control information. The lower layer control information may include, for example, downlink control information (DCI) including scheduling information of at least one of PDSCH and PUSCH.

Note that DCI that schedules PDSCH may be referred to as DL assignment, DL DCI, or the like, and DCI that schedules PUSCH may be referred to as UL grant, UL DCI, or the like. Note that PDSCH may be replaced with DL data, and PUSCH may be replaced with UL data.

A control resource set (CORESET) and a search space may be used to detect PDCCH. CORESET corresponds to a resource that searches for DCI. The search space corresponds to a search area and a search method for PDCCH candidates. One CORESET may be associated with one or more search spaces. UE may monitor CORESET associated with a given search space based on search space configuration.

One SS may correspond to a PDCCH candidate corresponding to one or more aggregation levels. One or more search spaces may be referred to as a search space set. Note that "search space", "search space set", "search space configuration", "search space set configuration", "CORESET", "CORESET configuration", and the like in the present disclosure may be replaced with each other.

By means of PUCCH channel state information (CSI), delivery confirmation information (for example, hybrid automatic repeat request acknowledgement (HARQ-ACK), which may be referred to as ACK/NACK or the like), scheduling request (SR), and the like may be transmitted. By means of PRACH, a random access preamble for establishing a connection with a cell may be transmitted.

Note that in the present disclosure, downlink, uplink, and the like may be expressed without "link". Various channels may be expressed without adding "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as DL-RS.

The synchronization signal may be, for example, at least one of a primary synchronization signal (PSS) and a secondary synchronization signal (SSS). A signal block including SS (PSS or SSS) and PBCH (and DMRS for PBCH) may be referred to as an SS/PBCH block, an SSB (SS Block), and the like. Note that SS, SSB, or the like may also be referred to as a reference signal.

In the radio communication system 1, a sounding reference signal (SRS), a demodulation reference signal (DMRS), and the like may be transmitted as an uplink reference signal (UL-RS). Note that DMRS may be referred to as a UE-specific reference signal.

Base Station

Figure 6:
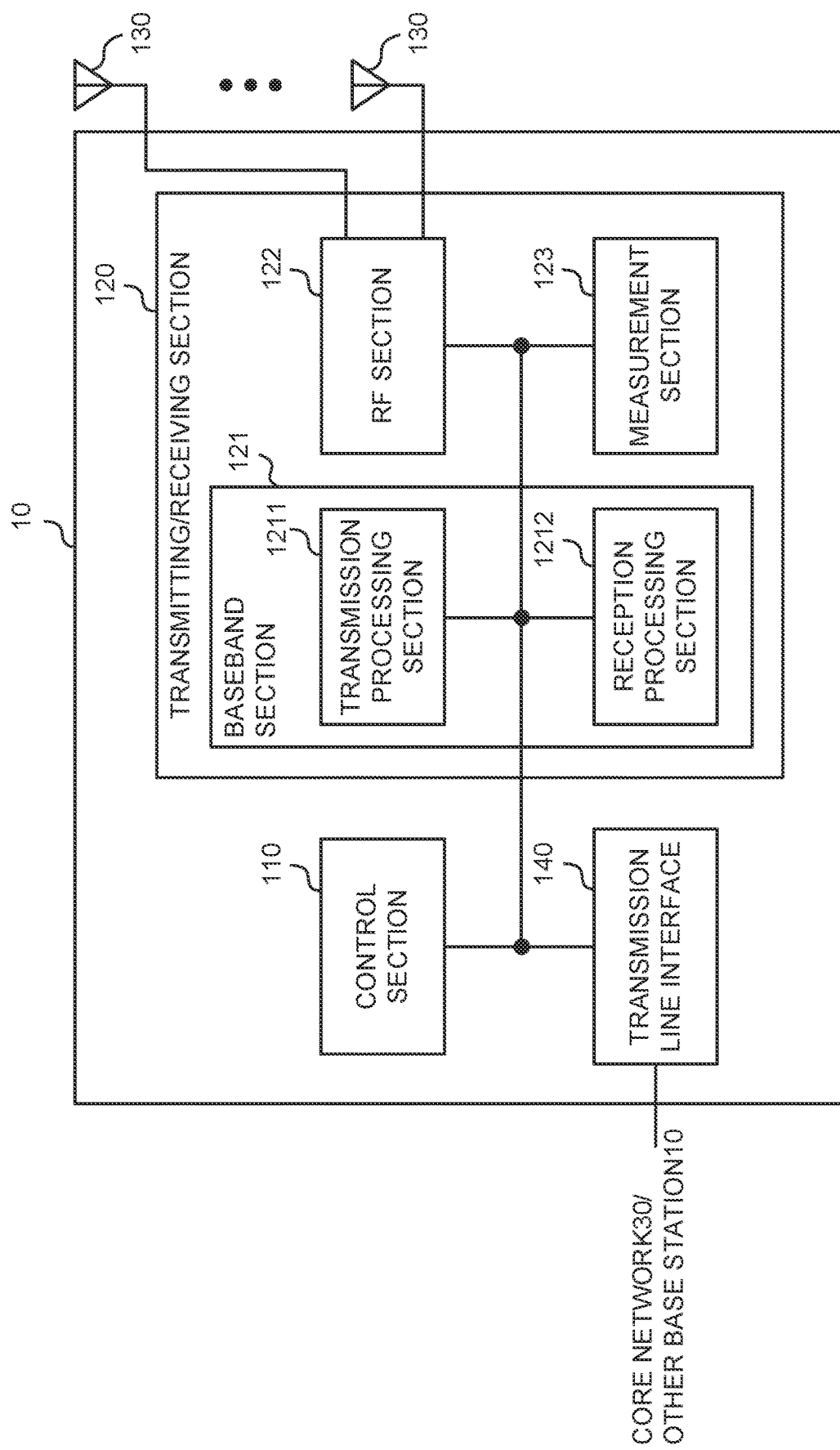
FIG. 6 is a diagram illustrating an example of a configuration of a base station according to an embodiment.

FIG. 6 is a diagram illustrating an example of a configuration of a base station according to an embodiment. The base station 10 includes a control section 110, a transmitting/receiving section 120, a transmitting/receiving antenna 130, and a transmission line interface 140. Note that one or more of the control sections 110, one or more of the transmitting/receiving sections 120, one or more of the transmitting/receiving antennas 130, and one or more of the transmission line interfaces 140 may be included.

Note that this example mainly describes a functional block which is a characteristic part of the present embodiment, and it may be assumed that the base station 10 also has another functional block necessary for radio communication. A part of processing of each section described below may be omitted.

The control section 110 controls the entire base station 10. The control section 110 can be constituted by a controller, a control circuit, or the like, which is described based on common recognition in the technical field to which the present disclosure relates.

The control section 110 may control signal generation, scheduling (for example, resource allocation or mapping), and the like. The control section 110 may control transmitting/receiving, measurement, and the like using the transmitting/receiving section 120, the transmitting/receiving antenna 130, and the transmission line interface 140. The control section 110 may generate data to be transmitted as a signal, control information, a sequence, and the like, and may transfer the data, the control information, the sequence, and the like to the transmitting/receiving section 120. The control section 110 may perform call processing (such as configuration or releasing) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can be constituted by a transmitter/receiver, an RF circuit, a baseband circuit, a filter, a phase shifter, a measurement circuit, a transmitting/receiving circuit, and the like, which are described based on common recognition in the technical field to which the present disclosure relates.

The transmitting/receiving section 120 may be constituted as an integrated transmitting/receiving section, or may be constituted by a transmission section and a receiving section. The transmission section may be constituted by the transmission processing section 1211 and the RF section 122. The receiving section may be constituted by the reception processing section 1212, the RF section 122, and the measurement section 123.

The transmitting/receiving antenna 130 can be constituted by an antenna described based on common recognition in the technical field to which the present disclosure relates, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data acquired from the control section 110 or control information to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog transform on the bit string to be transmitted, and may output a baseband signal.

The transmitting/receiving section 120 (RF section 122) may perform modulation to a radio frequency band, filtering processing, amplification, and the like on the baseband signal, and may transmit a signal in the radio frequency band via the transmitting/receiving antenna 130.

Meanwhile, the transmitting/receiving section 120 (RF section 122) may perform amplification, filtering processing, demodulation to a baseband signal, and the like on the signal in the radio frequency band received by the transmitting/receiving antenna 130.

The transmitting/receiving section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 120 (measurement section 123) may perform measurement on the received signal. For example, the measurement section 123 may perform radio resource management (RRM) measurement, channel state information (CSI) measurement, and the like based on the received signal. The measurement section 123 may measure received power (for example, reference signal received power (RSRP)), received quality (for example, reference signal received quality (RSRQ), signal to interference plus noise ratio (SINR), or signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, other base stations 10, and the like, and may acquire, transmit, and the like user data (user plane data), control plane data, and the like for the user terminal 20.

Note that the transmission section and the receiving section of the base station 10 in the present disclosure may be constituted by at least one of the transmitting/receiving section 120, the transmitting/receiving antenna 130, and the transmission line interface 140.

Note that the transmitting/receiving section 120 may transmit a physical downlink control channel for system information (for example, OSI) or paging (for example, PCCH) to the user terminal 20 in a connected mode. In addition, the transmitting/receiving section 120 may transmit system information or configuration information such as CORESET for paging, a search space, a PDCCH monitoring occasion, or a TCI-state for PDCCH. The control section 110 may schedule system information and paging.

User Terminal

Figure 7:
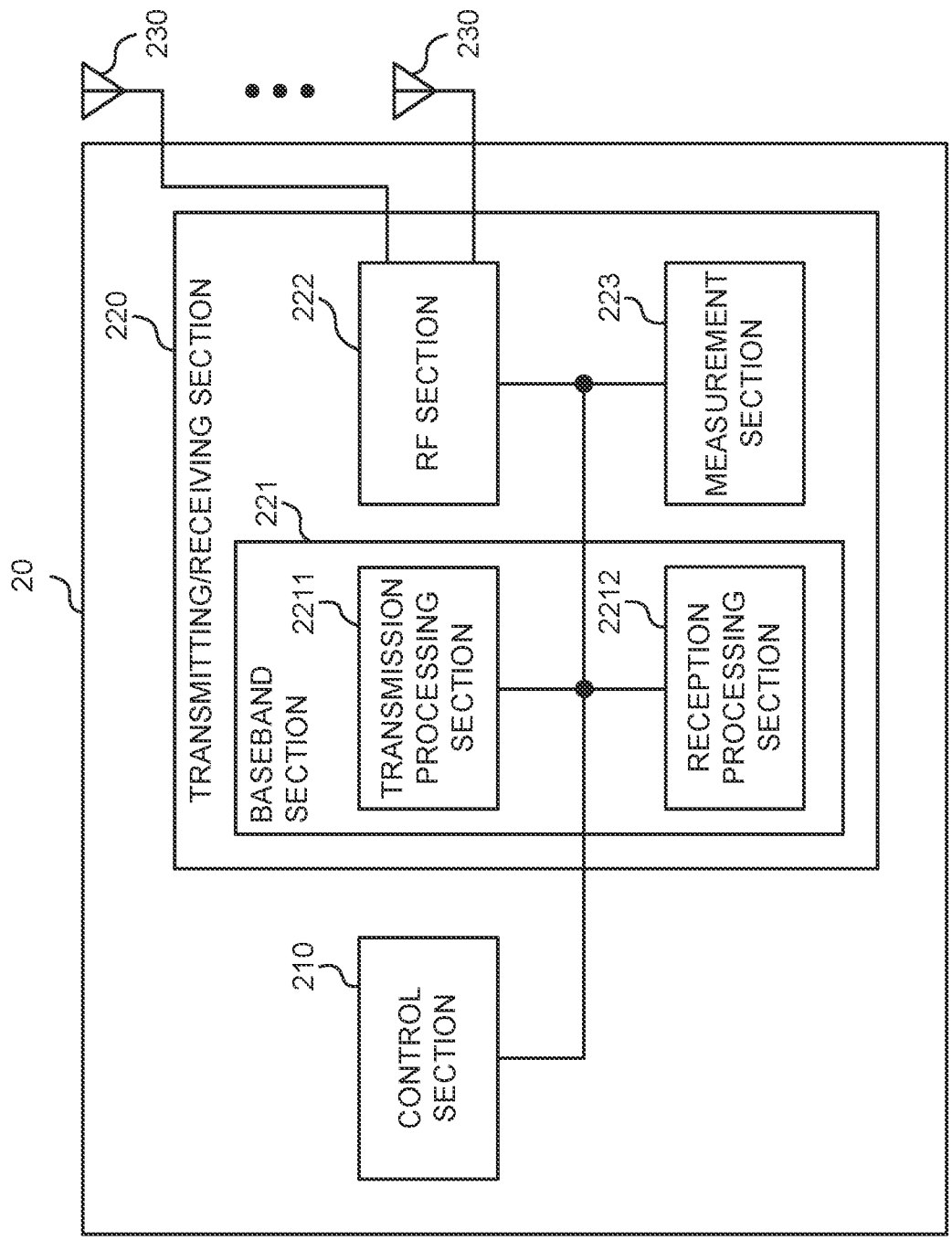
FIG. 7 is a diagram illustrating an example of a configuration of a user terminal according to an embodiment.

FIG. 7 is a diagram illustrating an example of a configuration of a user terminal according to an embodiment. The user terminal 20 includes a control section 210, a transmitting/receiving section 220, and a transmitting/receiving antenna 230. Note that one or more of the control sections 210, one or more of the transmitting/receiving sections 220, and one or more of the transmitting/receiving antennas 230 may be included.

Note that, although this example mainly describes a functional block which is a characteristic part of the present embodiment, it may be assumed that the user terminal 20 also has another functional block necessary for radio communication. A part of processing of each section described below may be omitted.

The control section 210 controls the entire user terminal 20. The control section 210 can be constituted by a controller, a control circuit, or the like, which is described based on common recognition in the technical field to which the present disclosure relates.

The control section 210 may control signal generation, mapping, and the like. The control section 210 may control transmitting/receiving, measurement, and the like using the transmitting/receiving section 220 and the transmitting/receiving antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted by a transmitter/receiver, an RF circuit, a baseband circuit, a filter, a phase shifter, a measurement circuit, a transmitting/receiving circuit, and the like, which are described based on common recognition in the technical field to which the present disclosure relates.

The transmitting/receiving section 220 may be constituted as an integrated transmitting/receiving section, or may be constituted by a transmission section and a receiving section. The transmission section may be constituted by the transmission processing section 2211 and the RF section 222. The receiving section may be constituted by the reception processing section 2212, the RF section 222, and the measurement section 223.

The transmitting/receiving antenna 230 can be constituted by an antenna described based on common recognition in the technical field to which the present disclosure relates, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data acquired from the control section 210 or control information to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog transform on a bit string to be transmitted, and may output a baseband signal.

Note that whether or not to apply DFT processing may be determined based on configuration of transform precoding. When transform precoding is enabled for a channel (for example, PUSCH), the transmitting/receiving section 220 (transmission processing section 2211) may perform DFT processing as the transmission processing in order to transmit the channel using a DFT-s-OFDM waveform. When transform precoding is not enabled for a channel (for example, PUSCH), the transmitting/receiving section 220 (transmission processing section 2211) does not have to perform DFT processing as the transmission processing.

The transmitting/receiving section 220 (RF section 222) may perform modulation to a radio frequency band, filtering processing, amplification, and the like on the baseband signal, and may transmit a signal in the radio frequency band via the transmitting/receiving antenna 230.

Meanwhile, the transmitting/receiving section 220 (RF section 222) may perform amplification, filtering processing, demodulation to a baseband signal, and the like on the signal in the radio frequency band received by the transmitting/receiving antenna 230.

The transmitting/receiving section 220 (reception processing section 2212) may acquire user data and the like by applying reception processing such as analog-digital transform, FFT processing, IDFT processing (if necessary), filtering processing, demapping, demodulation, decoding (which may include error correction decoding), MAC layer processing, RLC layer processing, or PDCP layer processing on the acquired baseband signal.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmission section and the receiving section of the user terminal 20 in the present disclosure may be constituted by at least one of the transmitting/receiving section 220, the transmitting/receiving antenna 230, and the transmission line interface 240.

Note that the transmitting/receiving section 220 may monitor a physical downlink control channel (for example, PDCCH) for system information (for example, OSI) or paging (for example, PCCH) in a connected mode. The control section 210 may determine a downlink reference signal (for example, a QCL source) that is quasi-co-location (QCL) for the physical downlink control channel based on one of association (association rule) between a physical downlink control channel monitoring occasion (PDCCH monitoring occasion) and a downlink reference signal (DL-RS, for example, SSB or CSI-RS), and configuration information indicating a downlink reference signal that is quasi-co-location (for example, TCI-state for PDCCH, list of TCI-states for PDCCH, or MAC CE) for a control resource set (CORESET, for example, CORESET #0 or common CORESET) including the physical downlink control channel.

In addition, the control section 210 may determine the downlink reference signal based on the association when the control resource set is a control resource set #0, and may determine the downlink reference signal based on the configuration information when the control resource set is not the control resource set #0 (aspect 1).

In addition, the control section 210 may determine the downlink reference signal based on the association regardless of whether or not the control resource set is the control resource set #0 (aspect 2-1).

In addition, the control section 210 may determine the downlink reference signal based on the configuration information regardless of whether or not the control resource set is the control resource set #0 (aspect 2-2).

In addition, the control section 210 may apply different operations out of: a first operation (aspect 1) of determining the downlink reference signal based on the association when the control resource set is a control resource set #0, and determining the downlink reference signal based on the configuration information when the control resource set is not the control resource set #0; a second operation (aspect 2-1) of determining the downlink reference signal based on the association regardless of whether or not the control resource set is the control resource set #0; and a third operation (aspect 2-2) of determining the downlink reference signal based on the configuration information regardless of whether or not the control resource set is the control resource set #0 to a case where the physical downlink control channel is for system information and a case where the physical downlink control channel is for paging (aspect 3).

Hardware Configuration

Note that the block diagrams used to describe the above embodiments illustrate blocks in functional units. These functional blocks (components) are implemented in an arbitrary combination with at least one of hardware and software. A method for implementing each of the functional blocks is not particularly limited. That is, each of the functional blocks may be implemented by using a physically or logically coupled single apparatus, or may be implemented by using directly or indirectly connected two or more physically or logically separate apparatuses (for example, using wires or radio). The functional blocks may be implemented by combining software with the above-described single apparatus or the above-described plurality of apparatuses.

Here, the function includes, but is not limited to, deciding, determining, judging, calculating, computing, processing, deriving, investigating, searching, ascertaining, receiving, transmitting, outputting, accessing, solving, selecting, choosing, establishing, comparing, assuming, expecting, considering, broadcasting, notifying, communicating, forwarding, configuring, reconfiguring, allocating, mapping, and assigning. For example, a functional block (component) that causes transmission to function may be referred to as a transmitting unit, a transmitter, or the like. In any case, as described above, the implementation method is not particularly limited.

Figure 8:
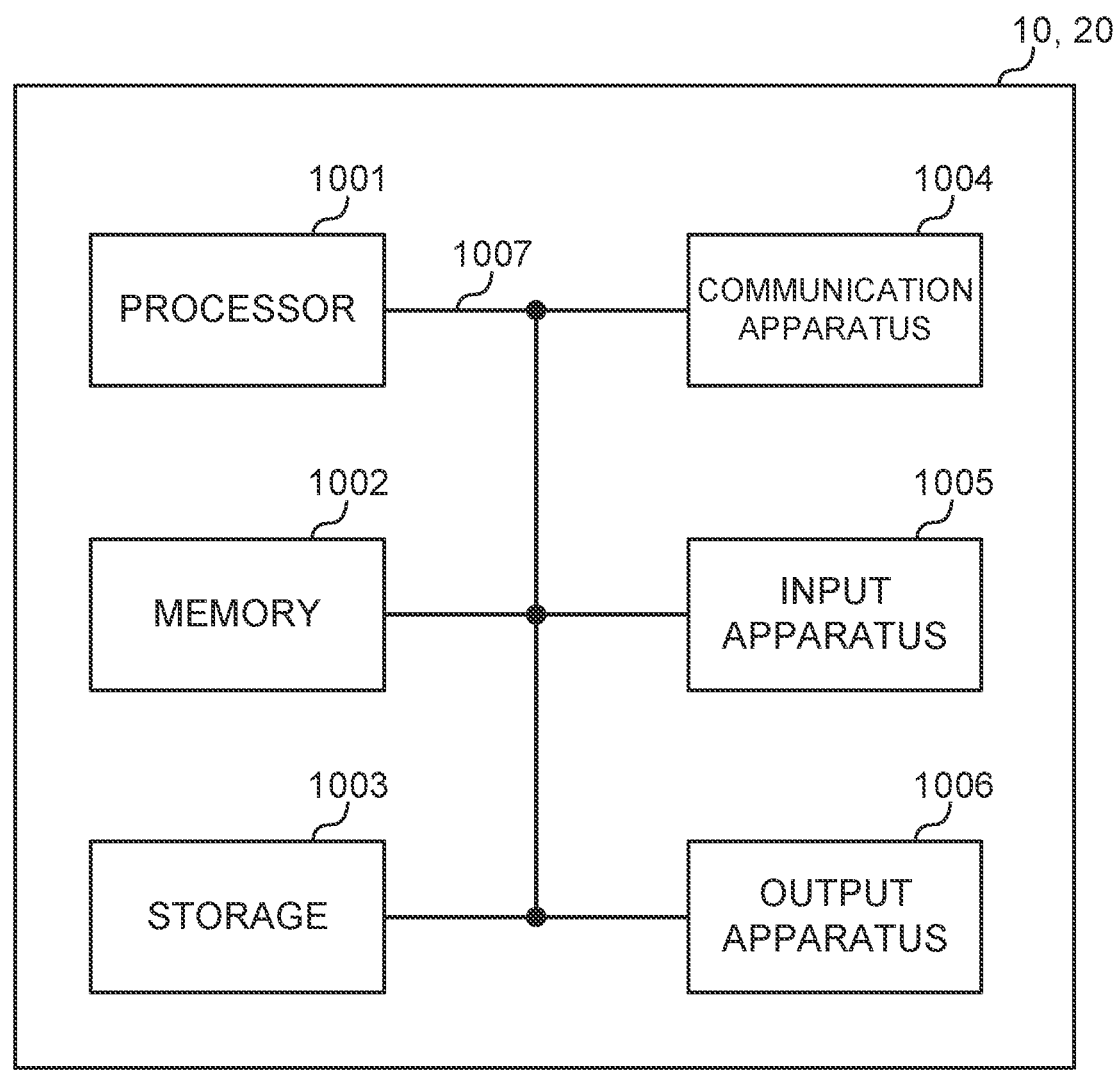
FIG. 8 is a diagram illustrating an example of a hardware configuration of a base station and a user terminal according to an embodiment.

For example, the base station, the user terminal, and the like according to an embodiment of the present disclosure may function as a computer that executes processing of the radio communication method of the present disclosure. FIG. 8 is a diagram illustrating an example of a hardware configuration of a base station and a user terminal according to an embodiment. Physically, the above-described base station 10 and user terminal 20 may be constituted as a computer apparatus including a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, an apparatus, a section, or a unit can be replaced with each other. The hardware configuration of the base station 10 and the user terminal 20 may include one or more apparatuses illustrated in the drawing, or does not have to include some apparatuses.

For example, although only one processor 1001 is illustrated, a plurality of processors may be disposed. Processing may be executed with one processor, or processing may be executed simultaneously, sequentially, or by using another method with two or more processors. Note that the processor 1001 may have one or more chips mounted thereon.

Each of functions of the base station 10 and the user terminal 20 is implemented by causing given software (program) to be read on hardware such as the processor 1001 or the memory 1002, thereby causing the processor 1001 to perform operation, controlling communication via the communication apparatus 1004, and controlling at least one of reading and writing of data in the memory 1002 and the storage 1003.

The processor 1001 controls the whole computer, for example, by operating an operating system. The processor 1001 may be constituted by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

The processor 1001 reads a program (program code), a software module, data, and the like from at least one of the storage 1003 and the communication apparatus 1004 into the memory 1002, and executes various types of processing according to these. As the program, a program to cause a computer to execute at least a part of the operation described in the above-described embodiment is used. For example, the control section 110 (210) may be implemented by a control program that is stored in the memory 1002 and operates in the processor 1001, and another functional block may be implemented similarly.

The memory 1002 is a computer-readable recording medium, and may be constituted by, for example, at least one of read only memory (ROM), erasable programmable ROM (EPROM), electrically EPROM (EEPROM), random access memory (RAY), and other appropriate storage media. The memory 1002 may be referred to as a register, a cache, a main memory (main storage apparatus), or the like. The memory 1002 can store, for example, a program (program code) that can be executed for performing a radio communication method according to an embodiment of the present disclosure or a software module.

The storage 1003 is a computer-readable recording medium, and may be constituted by, for example, at least one of a flexible disk, a floppy (registered trademark) disk, a magneto-optical disk (for example, a compact disc (compact disc ROM (CD-ROM)), a digital versatile disc, a Blu-ray (registered trademark) disk), a removable disk, a hard disk drive, a smart card, a flash memory device (for example, a card, a stick, or a key drive), a magnetic stripe, a database, a server, and other appropriate storage media. The storage 1003 may be referred to as an auxiliary storage apparatus.

The communication apparatus 1004 is hardware (transmitting/receiving device) for performing inter-computer communication via at least one of a wired network and a radio network, and is referred to as, for example, "network device", "network controller", "network card", or "communication module". The communication apparatus 1004 may include a high frequency switch, a duplexer, a filter, a frequency synthesizer, and the like in order to implement, for example, at least one of frequency division duplex (FDD) and time division duplex (TDD). For example, the transmitting/receiving section 120 (220), the transmitting/receiving antenna 130 (230), and the like described above may be implemented by the communication apparatus 1004. The transmitting/receiving section 120 (220) may be implemented by physically or logically separating the transmission section 120*a* (220*a*) and the receiving section 120*b* (220*b*) from each other.

The input apparatus 1005 is an input device that receives input from the outside (for example, a keyboard, a mouse, a microphone, a switch, a button, or a sensor). The output apparatus 1006 is an output device that performs output to the outside (for example, a display, a speaker, or a light emitting diode (LED) lamp). Note that the input apparatus 1005 and the output apparatus 1006 may be integrated with each other (for example, a touch panel).

The apparatuses such as the processor 1001 and the memory 1002 are connected by the bus 1007 for communicating information. The bus 1007 may be constituted by a single bus, or may be constituted by buses that vary between apparatuses.

The base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented with at least one of these pieces of hardware.

Modification

Note that terms described in the present disclosure and terms necessary for understanding the present disclosure may be replaced with other terms that have the same or similar meanings. For example, a channel, a symbol, and a signal (or signaling) may be replaced with each other. The signal may be a message. A reference signal can be abbreviated as RS, and may be referred to as a pilot, a pilot signal, or the like depending on a standard to be applied. A "component carrier (CC)" may be referred to as a "cell", a "frequency carrier", a "carrier frequency", or the like.

A radio frame may be constituted by one or more periods (frames) in a time domain. Each of the one or more periods (frames) constituting the radio frame may be referred to as a subframe. Furthermore, the subframe may be constituted by one or more slots in a time domain. The subframe may be a fixed period (for example, 1 ms) not dependent on numerology.

Here, numerology may be a communication parameter applied to at least one of transmission and reception of a given signal or channel. Numerology may indicate at least one of, for example, a subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, and a specific windowing processing performed by the transceiver in a time domain.

The slot may be constituted by one or more symbols (orthogonal frequency division multiplexing (OFDM) symbols, single carrier frequency division multiple access (SC-FDMA) symbols, and the like) in a time domain. The slot may be a time unit based on numerology.

The slot may include a plurality of mini slots. Each of the mini slots may be constituted by one or more symbols in a time domain. The mini slot may be referred to as a subslot. The mini slot may be constituted by fewer symbols than the slot. PDSCH (or PUSCH) transmitted in a time unit larger than the mini slot may be referred to as PDSCH (PUSCH) mapping type A. PDSCH (or PUSCH) transmitted using the mini slot may be referred to as "PDSCH (PUSCH) mapping type B".

The radio frame, the subframe, the slot, the mini slot, and the symbol all represent a time unit in signal transmission. The radio frame, the subframe, the slot, the mini slot, and the symbol may be referred to as other names corresponding thereto, respectively. Note that time units such as the frame, the subframe, the slot, the mini slot, and the symbol in the present disclosure may be replaced with each other.

For example, one subframe may be referred to as TTI, a plurality of consecutive subframes may be referred to as TTI, or one slot or one mini slot may be referred to as TTI. That is, at least one of the subframe and TTI may be a subframe (1 ms) in the existing LTE, may be a period shorter than 1 ms (for example, one to thirteen symbols), or may be a period longer than 1 ms. Note that the unit to represent TTI may be referred to as the slot, the mini slot, or the like instead of the subframe.

Here, TTI refers to a minimum time unit of scheduling in radio communication, for example. For example, in an LTE system, scheduling is performed in which the base station allocates radio resources (frequency bandwidth that can be used in each user terminal, transmit power, and the like) to each user terminal in TTI units. Note that the definition of TTI is not limited thereto.

TTI may be a transmission time unit such as a channel-encoded data packet (transport block), a code block, or a codeword, or may be a processing unit such as scheduling or link adaptation. Note that, when TTI is given, a period of time (for example, the number of symbols) in which a transport block, a code block, a codeword, and the like are actually mapped may be shorter than the TTI.

Note that, when one slot or one mini slot is referred to as TTI, one or more TTIs (that is, one or more slots or one or more mini slots) may be a minimum time unit of scheduling. The number of slots (the number of mini slots) constituting the minimum time unit of the scheduling may be controlled.

TTI having a period of 1 ms may be referred to as usual TTI (TTI in 3GPP Rel. 8 to 12), normal TTI, long TTI, a usual subframe, a normal subframe, a long subframe, a slot, or the like. TTI shorter than normal TTI may also be referred to as shortened TTI, short TTI, partial TTI (or fractional TTI), a shortened subframe, a short subframe, a mini slot, a subslot, a slot, or the like.

Note that long TTI (for example, normal TTI or a subframe) may be replaced with TTI having a period exceeding 1 ms, and short TTI (for example, shortened TTI) may be replaced with TTI having a TTI duration less than the TTI duration of long TTI and equal to or more than 1 Ms.

The resource block (RB) is a resource allocation unit in a time domain and a frequency domain, and may include one or more consecutive subcarriers in the frequency domain. The number of subcarriers included in RB may be fixed regardless of numerology, and may be 12, for example. The number of subcarriers included in RB may be determined based on numerology.

RB may include one or more symbols in a time domain, and may have a length of one slot, one mini slot, one subframe, or one TTI. One TTI, one subframe, and the like may be each constituted by one or more resource blocks.

Note that one or more RBs may be referred to as a physical resource block (PRE), a subcarrier group (SCG), a resource element group (REG), a PRB pair, an RB pair, or the like.

The resource block may be constituted by one or more resource elements (REs). For example, one RE may be a radio resource field of one subcarrier and one symbol.

A bandwidth part (BWP) (which may be referred to as a partial bandwidth or the like) may represent a subset of consecutive common resource blocks (RBs) for a given numerology in a given carrier. Here, the common RB may be specified by an RB index based on a common reference point of the carrier. PRB may be defined in a given BWP and may be numbered within the BWP.

BWP may include BWP for UL (UL BWP) and BWP for DL (DL BWP). For UE, one or more BWPs may be configured within one carrier.

At least one of the configured BWPs may be active, and UE does not have to assume that a given signal/channel is transmitted/received outside the active BWP. Note that a "cell", a "carrier", or the like in the present disclosure may be replaced with "BWP".

Note that the structures of the radio frame, subframe, slot, mini slot, symbol, and the like described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in RB, the number of symbols in TTI, the length of a symbol, and the length of a cyclic prefix (CP) can be variously changed.

The information, parameters, and the like described in the present disclosure may be represented using absolute values or relative values with respect to given values, or may be represented using other corresponding information. For example, a radio resource may be indicated by a given index.

Names used for parameters and the like in the present disclosure are not restrictive names in any respect. Furthermore, an equation and the like using these parameters may be different from those explicitly disclosed in the present disclosure. Since various channels (physical uplink control channel (PUCCH), physical downlink control channel (PDCCH), and the like) and information elements can be identified by any suitable names, various names assigned to these various channels and information elements are not restrictive names in any respect.

The information, signals, and the like described in the present disclosure may be represented by using any one of various different techniques. For example, data, instruction, command, information, a signal, a bit, a symbol, a chip, or the like that may be mentioned throughout the above description may be represented by voltage, current, electromagnetic wave, magnetic field or magnetic particles, optical field or photons, or an arbitrary combination thereof.

Information, a signal, and the like can be output in at least one of a direction from a higher layer to a lower layer and a direction from a lower layer to a higher layer. Information, a signal, and the like may be input/output via a plurality of network nodes.

The input/output information, signal, and the like can be stored in a specific location (for example, a memory) or can be managed using a management table. The input/output information, signal, and the like can be overwritten, updated, or appended. The output information, signal, and the like may be deleted. The input information, signal, and the like may be transmitted to another apparatus.

Notification of information may be performed not only by using the aspects/embodiments described in the present disclosure but also using another method. For example, notification of information in the present disclosure may be performed by using physical layer signaling (for example, downlink control information (DCI), uplink control information (UCI), higher layer signaling (for example, radio resource control (RRC) signaling, broadcast information (master information block (MIB), system information block (SIB), or the like), medium access control (MAC) signaling, another signal, or a combination thereof.

Note that physical layer signaling may be referred to as layer 1/layer 2 (L1/L2) control information (L1/L2 control signal), L1 control information (L1 control signal), and the like. RRC signaling may be referred to as an RRC message, and may be, for example, an RRC connection setup message or an RRC connection reconfiguration message. Notification of MAC signaling may be performed using, for example, a MAC control element (MAC CE).

Notification of given information (for example, notification of "being X") does not have to be performed explicitly but may be performed implicitly (for example, by not performing notification of the given information or by performing notification of another piece of information).

Judging may be performed in values represented by one bit (0 or 1), may be performed in Boolean values represented by true or false, or may be performed by comparing numerical values (for example, comparison with a given value).

Software should be widely interpreted to mean instruction, an instruction set, a code, a code segment, a program code, a program, a subprogram, a software module, an application, a software application, a software package, a routine, a subroutine, an object, an executable file, an execution thread, a procedure, a function, and the like regardless of whether being referred to as software, firmware, middleware, a microcode, and a hardware description language or referred to as another name.

Software, instruction, information, and the like may be transmitted/received via a communication medium. For example, when software is transmitted from a website, a server, or another remote source by using at least one of a wired technique (coaxial cable, optical fiber cable, twisted pair, digital subscriber line (DSL), or the like) and a radio technique (infrared rays, microwaves, and the like), at least one of the wired technique and the radio technique is included within the definition of a transmission medium.

The terms "system" and "network" used in the present disclosure can be used interchangeably. The "network" may mean an apparatus (for example, a base station) included in the network.

In the present disclosure, the terms such as "precoding", "precoder", "weight (precoding weight)", "quasi-co-location (QCL)", "transmission configuration indication (TCI) state", "spatial relation", "spatial domain filter", "transmit power", "phase rotation", "antenna port", "antenna port group", "layer", "layer number", "rank", "resource", "resource set", "resource group", "beam", "beam width", "beam angle", "antenna", "antenna element", and "panel" can be used interchangeably.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmitting/ receiving point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. When the base station accommodates a plurality of cells, the entire coverage area of the base station can be partitioned into a plurality of smaller areas, and each smaller area can provide a communication service through a base station subsystem (for example, an indoor small base station (remote radio head (RRH))). The term "cell" or "sector" refers to a part or the whole of a coverage area of at least one of a base station and a base station subsystem that perform a communication service in this coverage.

In the present disclosure, the terms such as "mobile station (MS)", "user terminal", "user equipment (UE)", "terminal", and the like can be used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmission apparatus, a reception apparatus, a radio communication apparatus, and the like. Note that at least one of the base station and the mobile station may be a device mounted on a moving object, a moving object itself, and the like. The moving object may be a vehicle (for example, a car or an airplane), an unmanned moving object (for example, a drone or an autonomous vehicle), or a robot (manned or unmanned). Note that at least one of the base station and the mobile station includes an apparatus that does not necessarily move during a communication operation. For example, at least one of the base station and the mobile station may be an Internet of Things (IoT) device such as a sensor.

The base station in the present disclosure may be replaced with a user terminal. For example, each aspect/embodiment of the present disclosure may be applied to a configuration in which communication between a base station and a user terminal is replaced with communication among a plurality of user terminals (which may be referred to as Device-to-Device (D2D), Vehicle-to-Everything (V2X), and the like). In this case, the user terminal 20 may have the above-described functions of the base station 10. The terms such as "uplink" and "downlink" may also be replaced with a term corresponding to inter-terminal communication (for example, "side"). For example, the uplink channel, the downlink channel, and the like may be replaced with a side channel.

Similarly, the user terminal in the present disclosure may be replaced with a base station. In this case, the base station 10 may have the above-described functions of the user terminal 20

In the present disclosure, an operation performed by the base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

Each aspect/embodiment described in the present disclosure may be used singly, used in combination thereof, or switched depending on execution. The order of the processing procedure, the sequence, the flowchart, and the like in each aspect/embodiment described in the present disclosure may be changed as long as inconsistencies do not arise. For example, regarding the methods described in the present disclosure, elements of various steps are presented using an illustrative order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new radio access technology (New-RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, and a next generation system expanded based on these. A plurality of systems may be combined (for example, a combination of LTE or LTE-A and 5G) and applied.

The phrase "based on" used in the present disclosure does not mean "based only on" unless otherwise specified. In other words, the phrase "based on" means both "based only on" and "based at least on".

Any reference to an element using designations such as "first" and "second" used in the present disclosure does not generally limit the amount or order of these elements. These designations can be used in the present disclosure as a convenient method for distinguishing two or more elements from each other. Therefore, reference to the first and second elements does not mean that only two elements are adoptable, or that the first element must precede the second element in some way.

The term "deciding (determining)" used in the present disclosure may encompass a wide variety of operations. For example, "deciding (determining)" may be considered as "deciding (determining)" of judging, calculating, computing, processing, deriving, investigating, looking up, search, or inquiry (for example, looking up in a table, database, or another data structure), ascertaining, and the like.

In addition, "deciding (determining)" may be considered as "deciding (determining)" of receiving (for example, receiving information), transmitting (for example, transmitting information), input, output, accessing (for example, accessing data in a memory), and the like.

In addition, "deciding (determining)" may be considered as "deciding (determining)" of resolving, selecting, choosing, establishing, comparing, and the like. In other words, "determining (deciding)" may be considered as "determining (deciding)" of some operation.

In addition, "deciding (determining)" may be replaced with "assuming", "expecting", "considering", or the like.

The term "maximum transmit power" described in the present disclosure may mean the maximum value of transmit power, the nominal UE maximum transmit power, or the rated UE maximum transmit power.

The terms "connected" and "coupled" used in the present disclosure or any variations thereof mean any direct or indirect connection or coupling between two or more elements, and may include presence of one or more intermediate elements between two elements "connected" or "coupled" to each other. Coupling or connection between elements may be physical, logical, or a combination thereof. For example, "connection" may be replaced with "access".

In the present disclosure, when two elements are connected to each other, it can be considered that these two elements are "connected" or "coupled" to each other by using one or more wires, cables, printed electrical connections, and the like, and as some non-limiting and non-inclusive examples, by using electromagnetic energy having wavelengths in a radio frequency domain, a microwave region, and a light (both visible and invisible) region.

In the present disclosure, a phrase "A and B are different" may mean "A and B are different from each other". Note that the term may mean "A and B are each different from C". The terms such as "separated" and "coupled" may be interpreted similarly to "be different".

In the present disclosure, when the terms "include" and "including", and variations thereof are used, these are intended to be inclusive similarly to the term "comprising". Furthermore, the term "or" used in the present disclosure is intended not to be an exclusive-OR.

In the present disclosure, when an article such as a, an, or the in English is added, the present disclosure may include that a noun following these articles is in the plural.

Although the invention according to the present disclosure has been described in detail above, it is obvious to a person skilled in the art that the invention according to the present disclosure is not limited to the embodiment described in the present disclosure. The invention according to the present disclosure can be implemented with corrections and in modification aspects without departing from the spirit and scope of the invention defined based on claims. Consequently, the description of the present disclosure is provided for the purpose of explaining examples, and should by no means be construed to limit the invention according to the present disclosure in any way.

The invention claimed is:

1. A terminal comprising:
a receiver that monitors, in a connected mode, a Physical Downlink Control CHannel (PDCCH) for at least one of a system information and a paging; and
a processor that, when a control resource set including the PDCCH is a control resource set with index 0, assumes a Quasi-Co-Location (QCL) relation of a DeModulation Reference Signal (DMRS) antenna port for the PDCCH by a first operation and, when the control resource set is not the control resource set with index 0, assumes a QCL relation of the DMRS antenna port by a second operation that is different from the first operation,
wherein the first operation is an operation that assumes a downlink reference signal notified by a Medium Access Control Control Element (MAC CE) and the DMRS antenna port have a QCL relation, or an operation that assumes a Synchronization Signal/Physical Broadcast Channel (SS/PBCH) block corresponding to a Physical Random Access Channel (PRACH) in a most recent random access procedure and the DMRS antenna port has a QCL relation,
the second opertaion is an operation that assumes a downlink reference signal indicated by a Transmission Configuration Indicator (TCI) state notified by a higher layer signaling and the DMRS antenna port have a QCL relation, and
the processor, when a list of a plurality of TCI states each corresponding to different Transmission and Reception Points (TRPs) is notified by the higher layer signaling, assumes that a downlink reference signal indicated by a TCI state activated by a MAC CE among the list and the DMRS antenna port have a QCL relation.

2. A radio communication method for a terminal comprising:
monitoring, in a connected mode, a Physical Downlink Control CHannel (PDCCH) for at least one of a system information and a paging; and
when a control resource set including the PDCCH is a control resource set with index 0, assuming a Quasi-Co_location (QCL) relation of a DeModulation Reference Signal (DMRS) antenna port for the PDCCH by a first operation and, when the control resource set is not the control resource set with index 0, assuming a QCL relation of the DMRS antenna port by a second operation that is different from the first operation,
wherein the first operation is an operation that assumes a downlink reference signal notified by a Medium Access Control Control Element (MAC CE) and the DMRS antenna port have a QCL relation, or an operation that assumes a Synchronization Siganl/Physical Broadcast Channel (SS/PBCH) block corresponding to a Physical Random Access Channel (PRACH) in a most recent random access procedure and the DMRS antenna port have a QCL relation,
the second operation is an operation that assumes a downlink reference signal indiated by a Transmission Configuration Indicator (TCI) state notified by a higher layer signaling and the DMRS antenna port have a QCL relation, and
when a list of a plurality of TCI states each corresponding to different Transmission and Reception Points (TRPs) is notified by the higher layer signaling, assuming that a downlink reference signal indicated by a TCI state activated by a MAC CE among the list and the DMRS antenna port have a QCL relation.

3. A system comprising a terminal and a base station, wherein:
the terminal comprises:
a receiver that monitors, in a connected mode, a Physical Downlink Control CHannel (PDCCH) for at least one of a system information and a paging; and
a processor that, when a control resource set including the PDCCH is a control rresource set with index 0, assumes a Quasi-Co-Location (QCL) relation of a DeModulation Reference Signal (DMRS) antenna port for the PDCCH by a first operation and, when the control resource set is not the control resource set with index 0, assumes a QCL relation of the DMRS antenna port by a second operation that is different from the first operation,
wherein the first operation is an operation that assumes a downlink reference signal notified by a Medium Access Control Control Element (MAC CE) and the DMRS antenna port have a QCL relation, or an operation that assumes a Synchronization Signal/Physical Broadcast Channel (SS/PBCH) block corresponding to a Physical Random Access Channel (PRACH) in a most recent random access procedure and the DMRS antenna port have a QCL relation,
the second operation is an operation that assumes a downlink reference signal indiated by a Transmission Configureation Indicator (TCI) state notified by a higheer layer signaling and the DMRS antenna port have a QCL relation, and the processor, when a list of a plurality of TCI states each corresponding to different Transmission and Reception Points (TRPs) is notified by the higher layer signaling, assumes that a downlink reference signal indicated by a TCI state activated by a MAC CE among the list and the DMRS antenna port have a QCL relation, and the base station comprises:
  a transmitter that transmits the PDCCH.

* * * * *